(12) United States Patent
Schloesser

(10) Patent No.: US 9,522,629 B2
(45) Date of Patent: Dec. 20, 2016

(54) HAZARD ALERT SYSTEM

(71) Applicant: Martin Schloesser, La Porte, IN (US)

(72) Inventor: Martin Schloesser, La Porte, IN (US)

( * ) Notice: Subject to any disclaimer, the term of this patent is extended or adjusted under 35 U.S.C. 154(b) by 36 days.

(21) Appl. No.: 14/645,703

(22) Filed: Mar. 12, 2015

(65) Prior Publication Data
US 2016/0264043 A1    Sep. 15, 2016

(51) Int. Cl.
*B60Q 7/00*    (2006.01)
*B60Q 1/46*    (2006.01)

(52) U.S. Cl.
CPC ..................................... *B60Q 1/46* (2013.01)

(58) Field of Classification Search
CPC ....................................................... B60Q 1/46
USPC ......................................................... 340/473
See application file for complete search history.

(56) References Cited

U.S. PATENT DOCUMENTS

| | | | |
|---|---|---|---|
| 2,613,463 A | 5/1949 | Transue | |
| 2,920,309 A | 1/1960 | Fultz | |
| 4,825,192 A * | 4/1989 | Wells | B60R 19/38 116/32 |
| 4,835,515 A | 5/1989 | McDermott et al. | |
| 5,355,117 A * | 10/1994 | Jefferson | B60Q 1/48 16/280 |
| 5,815,969 A | 10/1998 | Brouwer | |
| 5,847,642 A * | 12/1998 | Esposito | B60Q 1/50 340/433 |
| 6,037,866 A * | 3/2000 | Leibowitz | B60Q 7/00 340/431 |
| 6,100,800 A | 8/2000 | Sigari | |
| 6,915,757 B2 * | 7/2005 | Urban | B60Q 7/005 116/173 |
| D556,617 S | 12/2007 | Darolfi et al. | |
| 7,774,966 B2 * | 8/2010 | Rosa | G09F 17/00 40/590 |
| 2004/0075239 A1 * | 4/2004 | Call | B62D 47/025 280/403 |
| 2006/0265922 A1 * | 11/2006 | Shaffer | G09F 21/048 40/591 |

FOREIGN PATENT DOCUMENTS

WO     WO0074973     12/2000

* cited by examiner

*Primary Examiner* — Juan A Torres

(57) ABSTRACT

A hazard alert system includes a vehicle that has a door, a bed and a hitch. The bed has a back wall and a lateral wall. A frame is attached to the vehicle and the frame has a first section and a second section. A panel is movably coupled to the frame and the panel is positioned between a deployed position and a stored position. The panel provides a barrier between oncoming traffic and the door on the vehicle when the panel is positioned in the deployed position such that a driver of the vehicle may safely exit the vehicle. An actuator is coupled to the frame and the actuator urges the panel between the stored position and the deployed position.

13 Claims, 7 Drawing Sheets

HAZARD ALERT SYSTEM

BACKGROUND OF THE DISCLOSURE

Field of the Disclosure

The disclosure relates to alert devices and more particularly pertains to a new alert device for discretely alerting authorities in the event of an emergency.

SUMMARY OF THE DISCLOSURE

An embodiment of the disclosure meets the needs presented above by generally comprising a vehicle that has a door, a bed and a hitch. The bed has a back wall and a lateral wall. A frame is attached to the vehicle and the frame has a first section and a second section. A panel is movably coupled to the frame and the panel is positioned between a deployed position and a stored position. The panel provides a barrier between oncoming traffic and the door on the vehicle when the panel is positioned in the deployed position such that a driver of the vehicle may safely exit the vehicle. An actuator is coupled to the frame and the actuator urges the panel between the stored position and the deployed position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
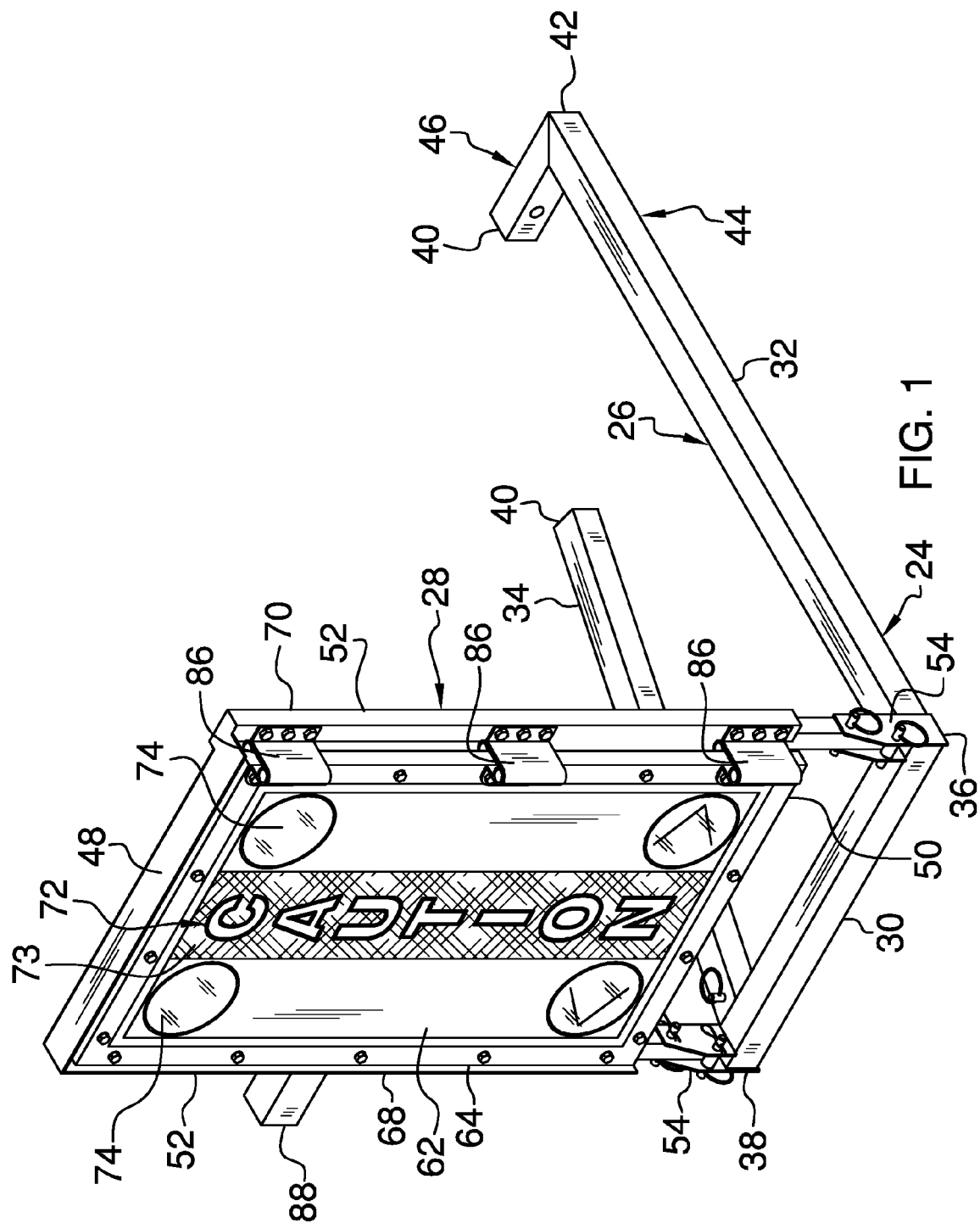
FIG. 1 is a front perspective view of a hazard alert system according to an embodiment of the disclosure.
Figure 2:
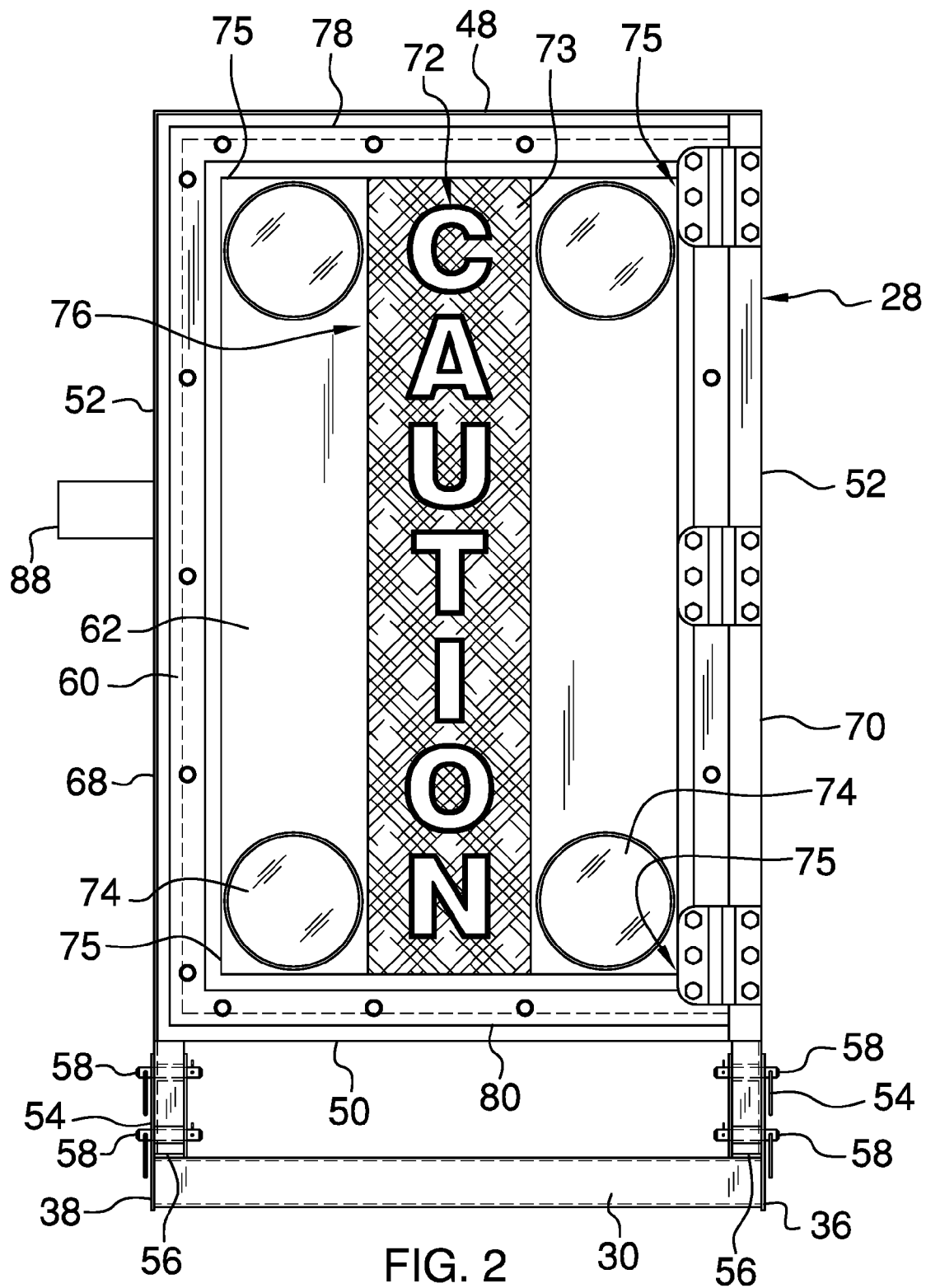
FIG. 2 is a front view of an embodiment of the disclosure.
Figure 3:
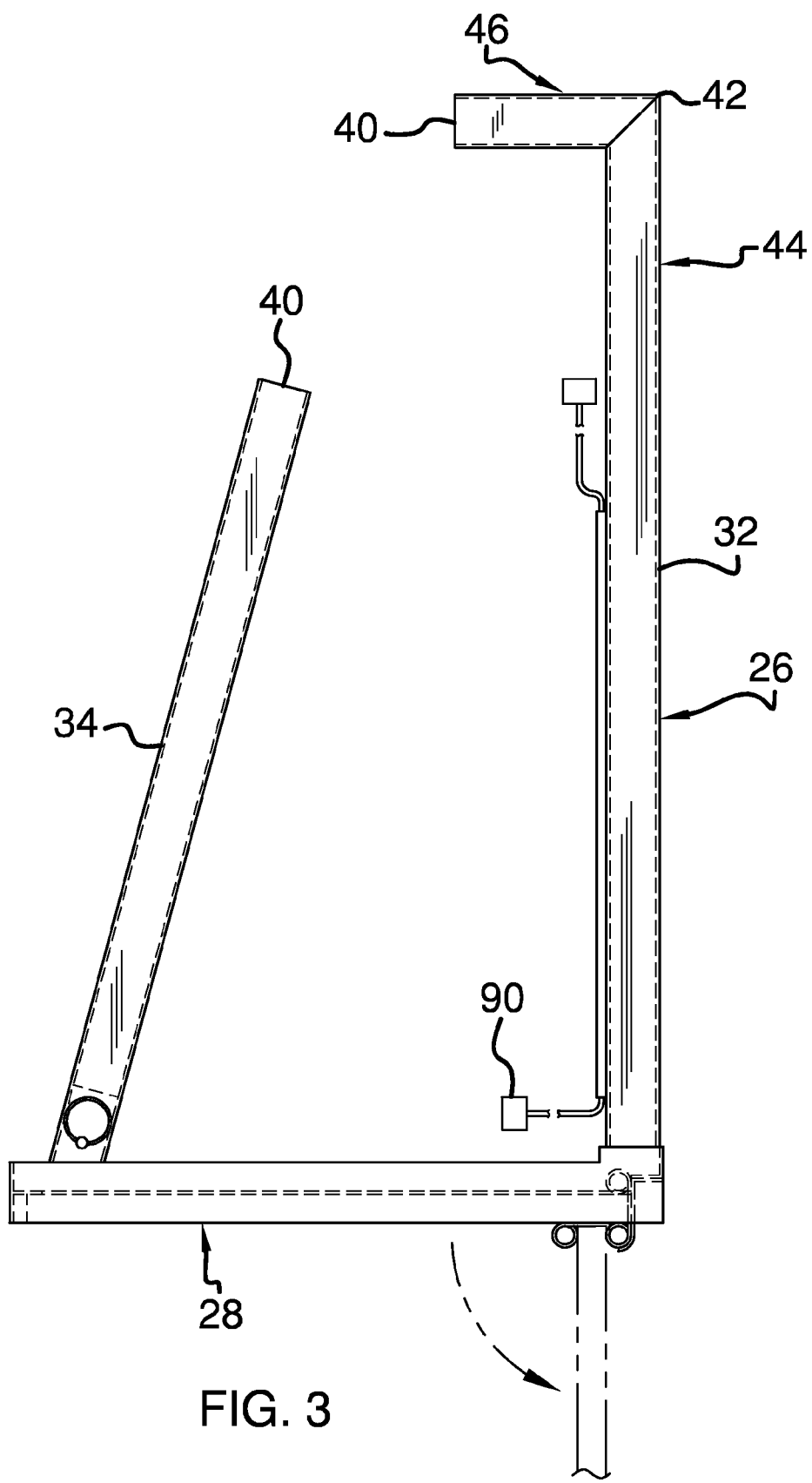
FIG. 3 is a bottom view of an embodiment of the disclosure.
Figure 4:
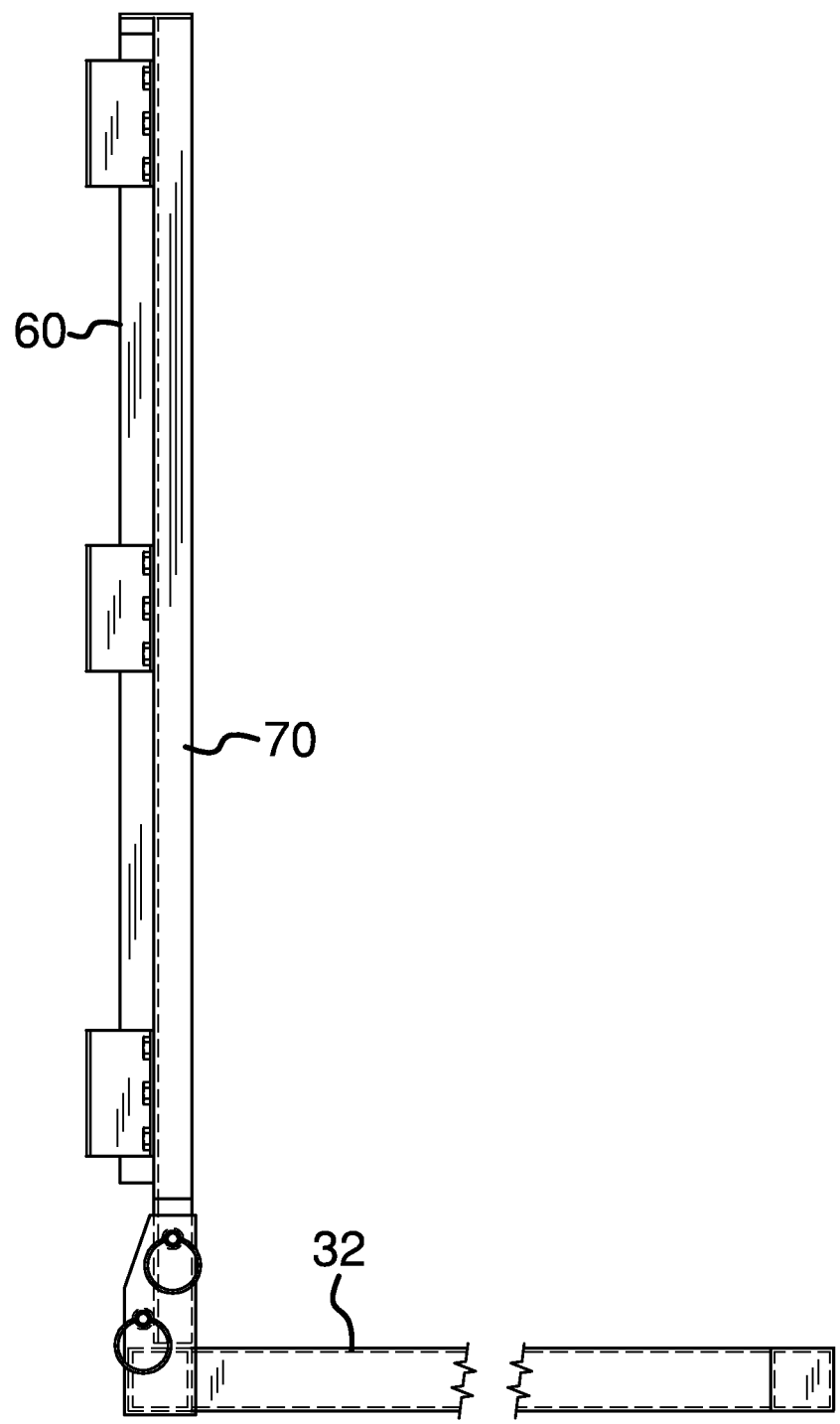
FIG. 4 is a left side view of an embodiment of the disclosure.
Figure 5:
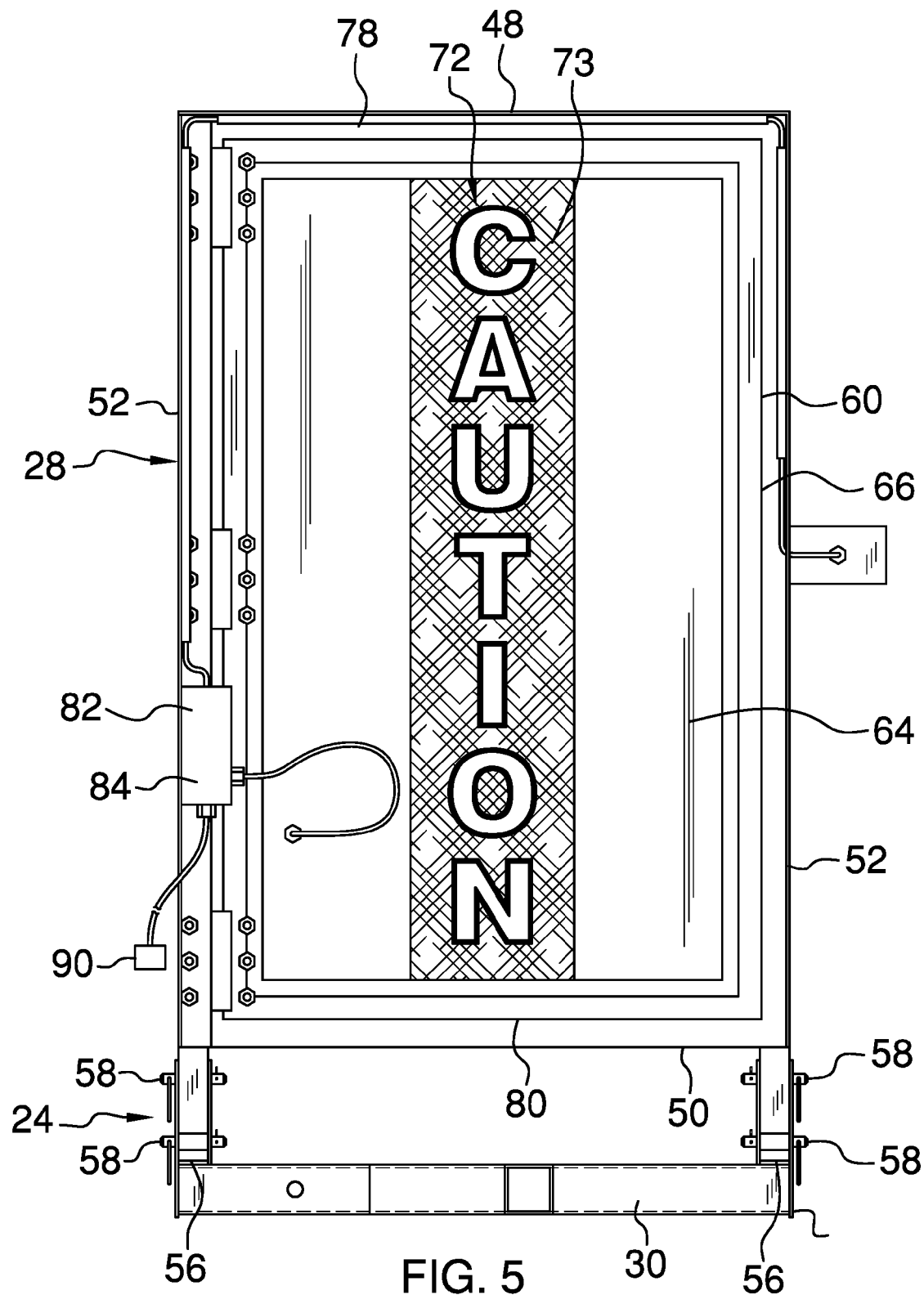
FIG. 5 is a back view of an embodiment of the disclosure.
Figure 6:
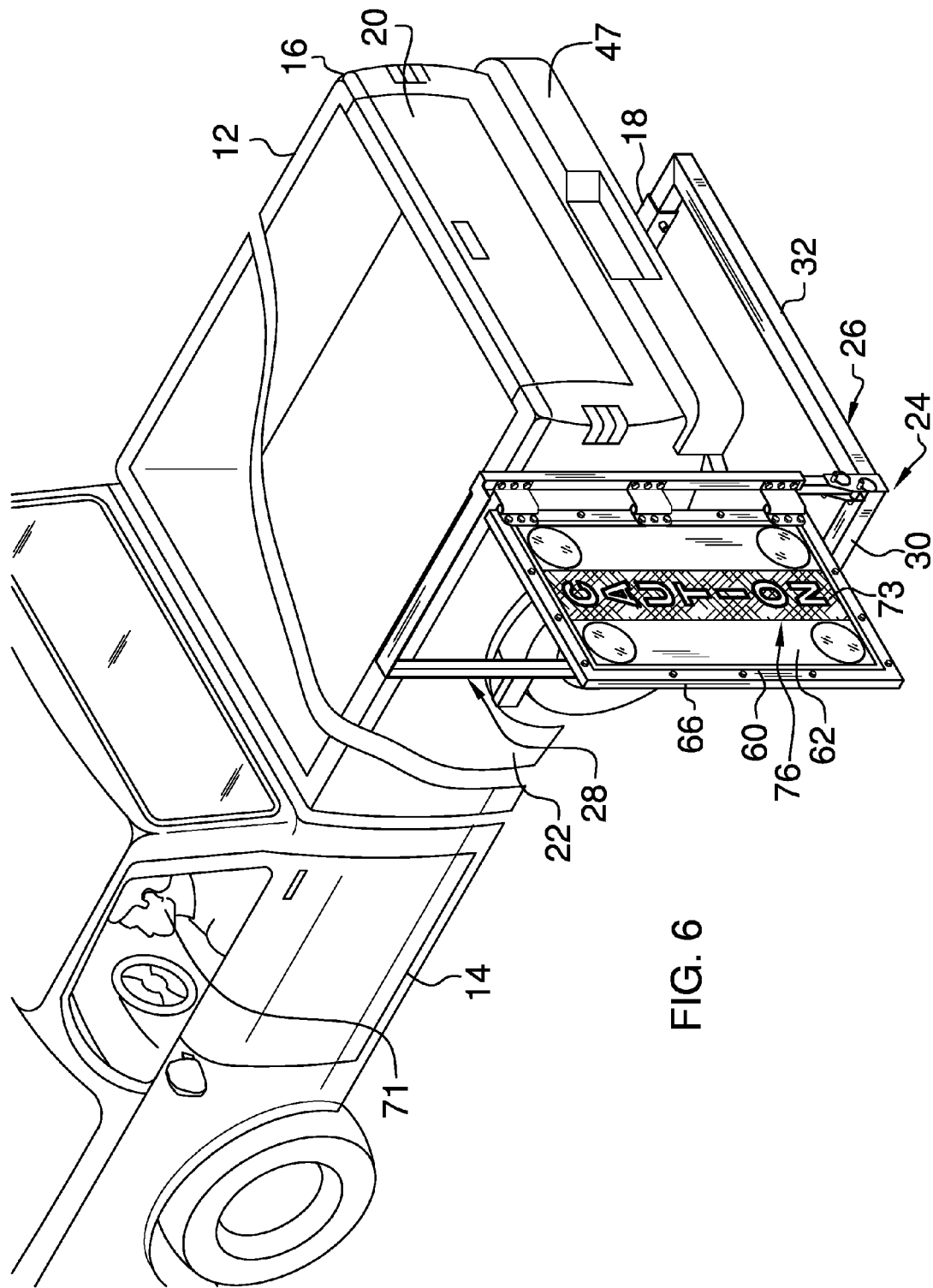
FIG. 6 is a rear perspective in-use view of an embodiment of the disclosure.
Figure 7:
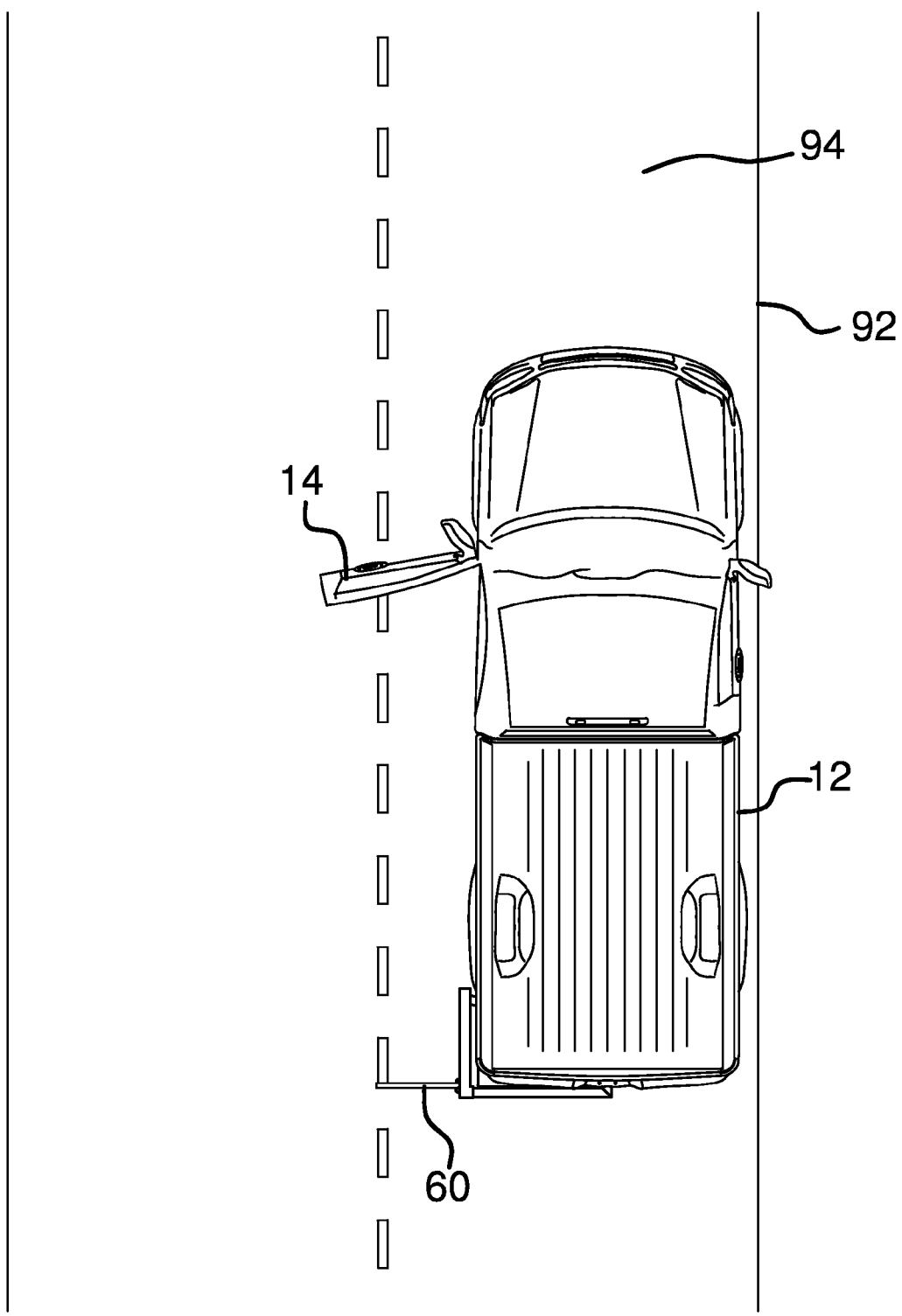
FIG. 7 is a top perspective in-use view of an embodiment of the disclosure.

With reference now to the drawings, and in particular to FIGS. 1 through 7 thereof, a new alert device embodying the principles and concepts of an embodiment of the disclosure and generally designated by the reference numeral 10 will be described.

As best illustrated in FIGS. 1 through 7, the hazard alert system 10 generally comprises a vehicle 12 that has a door 14, a bed 16 and a hitch 18. The bed 16 has a back wall 20 and a lateral wall 22. A frame 24 is provided that is attached to the vehicle 12 and the frame 24 has a first section 26 and a second section 28. The first section 26 comprises a central member 30, a first lateral member 32 and a second lateral member 34. The central member 30 has the first lateral member 32 and the second lateral member 34 attached thereto and the central member 30 has a first end 36 and a second end 38. The first lateral member 32 and the second lateral member 34 are each positioned adjacent to one of the first end 36 and the second end 38.

Each of the first lateral member 32 and the second lateral member 34 has a distal end 40 with respect to the central member 30. The first lateral member 32 has a bend 42 therein adjacent to the distal end 40 of the first lateral member 32 to define a first portion 44 forming an angle with respect to a second portion 46 of the first lateral member 32. The hitch 18 insertably receives the distal end 40 of the first lateral member 32. Thus, the first portion 44 of the first lateral member 32 extends along the back wall 20 of the bed 16 and the central member 30 extends forwardly along the lateral wall 22 of the bed 16. The second lateral member 34 may extend away from the central member 30 at an angle such that the distal end 40 of the second lateral member 34 is directed toward the first lateral member 32. The second lateral member 34 engages the lateral wall 22 of the bed 16. Alternatively, the distal end 40 of the first lateral member 32 may be fastened directly to a frame or a bumper of the vehicle 12 through the use of fasteners or through the use of a weld.

The second section 28 comprises a top member 48, a bottom member 50 and a pair of longitudinal members 52. Each of the longitudinal members 52 is coupled to and extends between the top member 48 and the bottom member 50. The longitudinal members 52 are spaced apart from each other, giving the second section 28 a rectangular shape. The bottom member 50 is removably coupled to the central member 30 such that the second section 28 extends upwardly from the first section 26. Each of the top member 48 and the bottom member 50 extends along the lateral wall 22 of the bed 16.

Each of the longitudinal members 52 may each extend downwardly beyond the bottom member 50. A pair of brackets 54 is each coupled to and extends upwardly from the central member 30. A free end 56 of each of the longitudinal members 52 engages one of the brackets 54. A plurality of pins 58 each extend through the brackets 54 and engage the longitudinal members 52, thereby retaining the second section 28 on the first section 26. An upper pair of the pins 58 may be removed from brackets 54 to facilitate the second section 28 to be tilted downwardly to be coextensive with the first section 26.

A panel 60 is movably coupled to the frame 24. The panel 60 has a front side 62, a rear side 64 and a peripheral edge 66 extending therebetween. The longitudinal members 52 include a first longitudinal member 68 and a second longitudinal member 70 and the panel 60 is hingedly coupled to the first longitudinal member 70. The front side and the rear side of the panel are comprised of a light reflecting material and the light reflecting material may be comprised of reflective traffic signage sheeting.

The panel 60 is positioned in a stored position that has the panel 60 extending between the first longitudinal member 52 and the second longitudinal member 70. Moreover, the panel 60 is positioned in a deployed position that has the panel 60 extending laterally away from the first longitudinal member 52. The front side 62 of the panel 60 lies on a plane that is perpendicular to a plane extending along the lateral wall 22 of the bed 16 when the panel 60 is in the deployed position. The panel 60 provides a barrier between oncoming traffic and the door 14 on the vehicle 12 when the door 14 is opened, allowing a driver 71 of the vehicle 12 to safely exit the vehicle 12.

A pair of strips 73 is provided. One of the strips 73 is attached to and is coextensive with the front side 62 and one of the strips 73 is attached to and is coextensive with the back side 64. Each of the strips 73 has cutouts therein and the cutouts define indicia 72. The indicia 72 may comprise a word issuing an alert of a hazard and the indicia 72 expose the reflective material of the front side 62 and the back side 64.

A plurality of light emitters 74 is coupled to the panel 60 and the light emitters 74 are positioned on the front side 62 of the panel 60. Each of the light emitters 74 is positioned adjacent to one of four corners 75 of the panel 60. Each of the light emitters 74 may have an arrow shape thereby allowing the light emitters 74 to direct oncoming traffic away from the vehicle 12.

An actuator 82 is provided that includes a lock 88 coupled to the frame 24. The lock 88 selectively engages the panel 60 to retain the panel 60 in the stored position. The lock 88 may be an electrically actuated solenoid or the like. The actuator 82 includes a control circuit 84 coupled to the second section 28 of the frame 24. The control circuit 84 is electrically coupled to the light emitters 74 and the vehicle 12. A control 90 is positioned within the vehicle 12 and is electrically coupled to the control circuit 84. The driver 71 of the vehicle 12 engages the control 90 to actuate and de-actuate the actuator 82. A plurality of hinges 86 is provided and the hinges 86 hingedly couple the panel 60 to the frame 24. The hinges 86 may be spring loaded hinges or the like to facilitate the hinges 86 urging the panel 60 into the deployed position when the actuator 82 is actuated to release the panel 60.

In use, the vehicle 12 is utilized in the convention of roadway maintenance or other activity requiring the vehicle 12 to be parked on an edge 92 of a roadway 94. The driver 71 engages the control 90 to position the panel 60 in the deployed position and to illuminate the light emitters 74. The lock 88 releases the panel 60 to extend laterally away from the vehicle 12 in a manner similar to the door 14 extending from the vehicle 12 when the door 14 is opened. The panel 60 provides a barrier that traffic must avoid, thusly preventing the traffic from striking the door 14 and possibly injuring the driver 71 as the driver 71 exits the vehicle 12. The driver 71 manually positions the panel 60 in the stored position and the lock 88 engages the panel 60 to retain the panel 60 in the stored position. The panel 60 is required to be manually positioned in the stored position to encourage the driver 71 to perform a 360 degree inspection of the vehicle 12 after the driver's 71 work has been completed. Additionally, the hinges 86 allow the panel 60 to be deflected from the deployed position if the panel 60 is accidentally struck by traffic.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hazard alert system configured to alert motorists to a hazard on a roadway, said system comprising:
   a vehicle having a door, a bed and a hitch, said bed having a back wall and a lateral wall;
   a frame attached to said vehicle, said frame having a first section and a second section;
   a panel movably coupled to said frame, said panel being positioned between a deployed position and a stored position, said panel being configured to provide a barrier between oncoming traffic and said door on said vehicle when said panel is positioned in said deployed position such that a driver of said vehicle may safely exit said vehicle;
   an actuator coupled to said frame, said actuator urging said panel between said stored position and said deployed position; and
   wherein said first section comprises a central member, a first lateral member and a second lateral member, said central member having said first lateral member and said second lateral member attached thereto, said central member having a first end and a second end, said first lateral member and said second lateral member each being positioned adjacent to one of said first end and said second end, each of said first lateral member and said second lateral member having a distal end with respect to said central member, said first lateral member having a bend therein adjacent to said distal end of said first lateral member to define a first portion and a second portion of said first lateral member.

2. The assembly according to claim 1, wherein said hitch insertably receives said distal end of said first lateral member such that said first portion of said first lateral member extends along said back wall of said bed and said central member extends forwardly along said lateral wall of said bed, said second lateral member engaging said lateral wall of said bed.

3. The assembly according to claim 1, further comprising:
   a plurality of light emitters coupled to said panel; and
   said actuator including a control circuit coupled to said second section of said frame, said control circuit being electrically coupled to said light emitters, said control circuit being electrically coupled to said vehicle.

4. The assembly according to claim 1, wherein a plurality of hinges, said hinges coupling said panel to said frame, said hinges urging said panel into said deployed position when said actuator is actuated to release said panel.

5. The assembly according to claim 3, further comprising a lock being coupled to said frame, said lock being electrically coupled to said control circuit, said lock selectively engaging said panel to retain said panel in said stored position.

6. The assembly according to claim 5, further comprising a control positioned within said vehicle, said control being electrically coupled to said control circuit, said control actuating said lock.

7. A hazard alert system configured to alert motorists to a hazard on a roadway, said system comprising:
a vehicle having a door, a bed and a hitch, said bed having a back wall and a lateral wall;
a frame attached to said vehicle, said frame having a first section and a second section;
a panel movably coupled to said frame, said panel being positioned between a deployed position and a stored position, said panel being configured to provide a barrier between oncoming traffic and said door on said vehicle when said panel is positioned in said deployed position such that a driver of said vehicle may safely exit said vehicle;
an actuator coupled to said frame, said actuator urging said panel between said stored position and said deployed position;
wherein said second section comprises a top member, a bottom member and a pair of longitudinal members, each of said longitudinal members being coupled to and extending between said top member and said bottom member, said longitudinal member being spaced apart from each other, said second section having a rectangular shape.

8. The assembly according to claim 7, wherein:
said first section includes a central member; and
said bottom member being removably coupled to said central member such that said second section extends upwardly from said first section, each of said top member and said bottom member extending along said lateral side of said bed.

9. The assembly according to claim 7, wherein said panel has a front side, a rear side and a peripheral edge extending therebetween, said longitudinal members including a first longitudinal member and a second longitudinal member, said panel being hingedly coupled to said first longitudinal member, said front side and said rear side being comprised of a light reflective material.

10. The assembly according to claim 9, wherein said panel being positioned in said stored position having said panel extending between said first longitudinal member and said second longitudinal member, said panel being positioned in said deployed position having said panel extending laterally away from said first longitudinal member such that said front side of said panel lies a plane being perpendicular to a plane extending along said lateral wall of said bed.

11. The assembly according to claim 9, further comprising a pair of strips, one of said strips being attached to and being coextensive with said front side, one of said strips being attached to and being coextensive with said back side, each of said strips having cutouts therein, said cutouts defining indicia, said indicia comprising words issuing an alert of a hazard.

12. The assembly according to claim 11, further comprising a plurality of light emitters coupled to said panel, said light emitters being positioned on said front side of said panel.

13. A hazard alert system configured to alert motorists to a hazard on a roadway, said system comprising:
a vehicle having a door, a bed and a hitch, said bed having a back wall and a lateral wall;
a frame attached to said vehicle, said frame having a first section and a second section, said first section comprising:
a central member, a first lateral member and a second lateral member, said central member having said first lateral member and said second lateral member attached thereto, said central member having a first end and a second end, said first lateral member and said second lateral member each being positioned adjacent to one of said first end and said second end, each of said first lateral member and said second lateral member having a distal end with respect to said central member, said first lateral member having a bend therein adjacent to said distal end of said first lateral member to define a first portion and a second portion of said first lateral member, said hitch insertably receiving said distal end of said first lateral member such that said first portion of said first lateral member extends along said back wall of said bed and said central member extends forwardly along said lateral wall of said bed, said second lateral member engaging said lateral wall of said bed;
said second section comprising:
a top member, a bottom member and a pair of longitudinal members, each of said longitudinal members being coupled to and extending between said top member and said bottom member, said longitudinal member being spaced apart from each other, said second section having a rectangular shape, said bottom member being removably coupled to said central member such that said second section extends upwardly from said first section, each of said top member and said bottom member extending along said lateral side of said bed;
a panel movably coupled to said frame, said panel having a front side, a rear side and a peripheral edge extending therebetween, said front side and said rear side being comprised of a light reflective material, said longitudinal members including a first longitudinal member and a second longitudinal member, said panel being hingedly coupled to said first longitudinal member, said panel being positioned in a stored position having said panel extending between said first longitudinal member and said second longitudinal member, said panel being positioned in a deployed position having said panel extending laterally away from said first longitudinal member such that said front side of said panel is lies a plane being perpendicular to a plane extending along said lateral wall of said bed, said panel being configured to provide a barrier between oncoming traffic and said door on said vehicle when said door is opened such that a driver of said vehicle may safely exit said vehicle;
a pair of strips, one of said strips being attached to and being coextensive with said front side, one of said strips being attached to and being coextensive with said back side, each of said strips having cutouts therein, said cutouts defining indicia, said indicia comprising words issuing an alert of a hazard;
a plurality of light emitters coupled to said panel, said light emitters being positioned on said front side of said panel;
an actuator coupled to said frame, said actuator urging said panel between said stored position and said deployed position, said actuator including:
a control circuit coupled to said second section of said frame, said control circuit being electrically coupled to said light emitters, said control circuit being electrically coupled to said vehicle;

a lock being coupled to said frame, said lock being electrically coupled to said control circuit, said lock selectively engaging said panel to retain said panel in said stored position;

a control positioned within said vehicle, said control being electrically coupled to said control circuit, said control actuating said lock; and a plurality of hinges, said hinges coupling said panel to said frame, said hinges urging said panel into said deployed position when said actuator is actuated to release said panel.

* * * * *